United States Patent [19]
Okamoto et al.

[11] Patent Number: 5,829,041
[45] Date of Patent: Oct. 27, 1998

[54] METHOD AND APPARATUS FOR MANAGING SINGLE VIRTUAL SPACE SUITABLE FOR DISTRIBUTED PROCESSING

[75] Inventors: Toshio Okamoto, Tokyo; Tetsuro Kimura; Kenji Shirakawa, both of Kanagawa-ken, all of Japan

[73] Assignee: Kabushiki Kaisha Toshiba, Kawasaki, Japan

[21] Appl. No.: 528,335

[22] Filed: Sep. 14, 1995

[30] Foreign Application Priority Data

Sep. 14, 1994 [JP] Japan ................................ 6-219655

[51] Int. Cl.$^6$ .................................................. G06F 13/00
[52] U.S. Cl. ...................... 711/147; 711/203; 395/200.46
[58] Field of Search ................... 395/650, 413, 395/474, 200.08, 200.43, 200.46; 711/203, 147

[56] References Cited

U.S. PATENT DOCUMENTS

| | | | |
|---|---|---|---|
| 5,155,834 | 10/1992 | Ryan et al. | 395/415 |
| 5,239,643 | 8/1993 | Blount et al. | 395/613 |
| 5,253,342 | 10/1993 | Blount et al. | 395/200.03 |
| 5,394,555 | 2/1995 | Hunter et al. | 395/800 |
| 5,446,854 | 8/1995 | Khalidi et al. | 395/401 |
| 5,588,138 | 12/1996 | Bai et al. | 395/497.04 |
| 5,592,625 | 1/1997 | Sandberg | 395/200.08 |

FOREIGN PATENT DOCUMENTS 6-19785  1/1994  Japan .

*Primary Examiner*—Tod R. Swann
*Assistant Examiner*—Christopher S. Chow
*Attorney, Agent, or Firm*—Foley & Lardner

[57] ABSTRACT

A single virtual space management scheme suitable for a distributed system. The single virtual space for arranging programs and/or data among a plurality of computers forming the distributed system are divided into a plurality of regions called memory chapters, and a part of the single virtual space to be managed independently by each computer is requested from each computer in units of these memory chapters. Then, a server allocates one of the memory chapters to each computer in response to each request from each computer, while managing allocations of the memory chapters to the plurality of computers so as not to allocate each one of the memory chapters to more than one computers. Each memory chapter allocated to each computer is independently managed by further dividing each memory chapter into a plurality of sub-regions called memory sections, and carrying out an access protection in units of these memory sections at each computer.

28 Claims, 15 Drawing Sheets

| CHAPTER ID | HOST ID | STATE |
|---|---|---|
| 0000 | — | UNUSED |
| 0001 | 1c02 | IN USE |
| 0002 | — | UNUSED |
| 0003 | 930f | IN USE |
| ⋮ | ⋮ | ⋮ |
| ffff | — | UNUSED |

| CHAPTER ID | | 0003 |
|---|---|---|
| POINTER TO NEXT CHAPTER | | 0007 |
| START ADDRESS | SIZE | STATE |
| 0003 0000 0000 0000 | 1 0000 0000 | UNUSED |
| 0003 0001 0000 0000 | 1 0000 0000 | IN USE |
| 0003 0002 0000 0000 | 3 5000 0000 | IN USE |
| 0003 0005 5000 0000 | 5000 0000 | UNUSED |
| ⋮ | ⋮ | ⋮ |
| 0003 ffff 0000 0000 | 1 0000 0000 | UNUSED |

FIG.12

| MEMORY SECTION ID | OWNER THREAD | OWNER HOST | ACCESS PROTECTION | | BACKING STORAGE | DISTRIBUTION STATE | CONSISTENCY CONTROL INFORMATION | OTHERS |
|---|---|---|---|---|---|---|---|---|
| | | | THREAD | PERMISSION | | | | |
| 0003 0000 .... | 10af | H-A | all | rw- | DISK A  0100 | H-B | COPY,VERSION3 | |
| 00a2 0000 ... | 4046 | H-B | all | r-x | — | H-A,H-D | VERSION11 | |

METHOD AND APPARATUS FOR MANAGING SINGLE VIRTUAL SPACE SUITABLE FOR DISTRIBUTED PROCESSING

BACKGROUND OF THE INVENTION

1. Field of the Invention

The present invention relates to a virtual space management scheme suitable for a case in which computer systems having virtual memory space management mechanisms are mutually connected through a network to form a distributed system.

2. Description of the Background Art

In recent years, due to a significant improvement in the computer performance and advances in the network technology, there has been an increasing popularity for use of a distributed processing in which a program is operated on a plurality of computers and processing is carried out in cooperation using communications among the computers.

In a conventional style of computer processing, the entire processing has been carried out independently by a single computer. Consequently, the operating system (OS) which is a basic program for managing computer resources and providing services to application programs has been developed for such a stand alone system. For instance, UNIX developed by AT&T and MVS developed by IBM are prime examples of such a conventional OS for a stand alone system.

Now, it is a relatively simple matter to expand a conventional OS to cope with an expansion to a new distributed processing style. Namely, a new function for a distributed processing can be additionally provided while maintaining conventionally provided functions.

However, this type of expansion has a practical limit, so that there remains a possibility for this type of expansion to be ineffective in flexibly dealing with requirements for new functions in the future.

In addition, all the application programs are to be operated on the OS, so that as the internal structure of the OS becomes progressively complicated due to repeated expansions, factors related to the OS itself such as its execution efficiency and its reliability can be critical matters.

In a conventional OS for a stand alone system, an address space in which application programs are to be executed has been managed by each computer separately. Consequently, in order to expand such a conventional OS to a distributed system, it has been customary to provide a special system call for that purpose. For instance, in the UNIX based OS called 4.3 BSD, a new system call "socket interface" is provided, while the application programs are operated on the usual address space. In this case, the conventional application programs which do not utilize the distributed processing can be operated without any change, but in designing new application programs adapted to the distributed processing, it is necessary for an application programmer to produce the new application programs by using this new system call, and comprehend an architecture of an expanded distributed system.

Also, depending on types of OS, a manner of expansion for the purpose of dealing with the distributed processing is different, so that it is necessary to modify the application programs to make them operable on the other OS as well.

Thus, when a conventional OS is expanded in order to deal with the distributed processing environment, different manners of handing are required for the virtual spaces for executing the application programs which are adapted to the distributed processing by different manners of expansion, and it becomes quite difficult to realize a reuse of programs or a utilization of shared data.

SUMMARY OF THE INVENTION

It is therefore an object of the present invention to provide a virtual space management scheme for realizing a network transparent virtual space in which the use of the distributed processing can be unconscious at the application level, by means of a network-wide expansion of a single virtual space in which all the applications are executed.

It is another object of the present invention to provide a virtual space management scheme capable of operating the OS and the applications efficiently, even when a single virtual space is commonly utilized by a plurality of computers which are actually capable of processing independently, without using management information such as how this single virtual space is utilized by other computers as much as possible.

According to one aspect of the present invention there is provided a method for managing a virtual space in a distributed system formed by a plurality of computers capable of communicating with each other, the method comprising the steps of: sharing a virtual space for arranging programs and/or data among said plurality of computers; dividing the virtual space into a plurality of regions; requesting from each computer a part of the virtual space to be managed independently by each computer, in units of said regions; and allocating one of said regions to each computer in response to each request from each computer, while managing allocations of said regions to said plurality of computers so as not to allocate each one of said regions to more than one computer.

According to another aspect of the present invention there is provided a distributed system, comprising: a plurality of computers capable of communicating with each other; a server for managing a virtual space for arranging programs and/or data shared among said plurality of computers by dividing the virtual space into a plurality of regions, allocating one of said regions to each computer in response to each request from each computer for securing a part of the virtual space to be managed independently by each computer, and managing allocations of said regions to said plurality of computers so as not to allocate each one of said regions to more than one computer.

According to another aspect of the present invention there is provided a computer apparatus for managing a virtual space for arranging programs and/or data shared among a plurality of computers capable of communicating with each other and forming a distributed system, the apparatus comprising: management table means for registering a state of allocations of a plurality of regions dividing the virtual space to said plurality of computers; and management means for allocating one of said regions to each computer in response to each request from each computer for securing a part of the virtual space to be managed independently by each computer, according to the management table means, so as not to allocate each one of said regions to more than one computer.

According to another aspect of the present invention there is provided a computer apparatus for constituting a distributed system to be formed by a plurality of computers which are sharing a virtual space for arranging programs and/or data managed by a server and capable of communicating with each other, the apparatus comprising: management means for requesting an allocation of a part of the virtual space to be managed independently by the apparatus, to the server in units of a plurality of regions dividing the virtual space, and independently managing each of said regions allocated to the apparatus by the server so as not to allocate each one of said regions to more than one computer; and management list means for registering utilization states of sub-regions further dividing each of said regions allocated to the apparatus, such that the management means independently manages each of said regions by carrying out an access protection in units of said sub-regions.

According to another aspect of the present invention there is provided an article of manufacture, comprising: a computer usable medium having computer readable program code means embodied therein for causing a server computer to manage a virtual space for arranging programs and/or data shared among a plurality of host computers capable of communicating with each other and forming a distributed system, the computer readable program code means including: first computer readable program code means for causing the server computer to register a state of allocations of a plurality of regions dividing the virtual space to said plurality of host computers; and second computer readable program code means for causing the server computer to allocate one of said regions to each host computer in response to each request from each host computer for securing a part of the virtual space to be managed independently by each host computer, according to the registered state of allocations, so as not to allocate each one of said regions to more than one host computer.

According to another aspect of the present invention there is provided an article of manufacture, comprising: a computer usable medium having computer readable program code means embodied therein for causing each host computer to constitute a distributed system to be formed by a plurality of host computers which are sharing a virtual space for arranging programs and/or data managed by a server computer and capable of communicating with each other, the computer readable program code means including: first computer readable program code means for causing each host computer to request an allocation of a part of the virtual space to be managed independently by each host computer, to the server computer in units of a plurality of regions dividing the virtual space; second computer readable program code means for causing each host computer to register utilization states of sub-regions further dividing each of said regions allocated to each host computer; and third computer readable program code means for causing each host computer to independently manage each of said regions allocated to each host computer by the server computer so as not to allocate each one of said regions to more than one host computer, by carrying out an access protection in units of said sub-regions.

Other features and advantages of the present invention will become apparent from the following description taken in conjunction with the accompanying drawings.

BRIEF DESCRIPTION OF THE DRAWINGS

FIG. 12 is a diagrammatic illustration of a memory section management table used in a second embodiment of a virtual space management scheme according to the present invention.

DETAILED DESCRIPTION OF THE PREFERRED EMBODIMENTS

Figure 1:
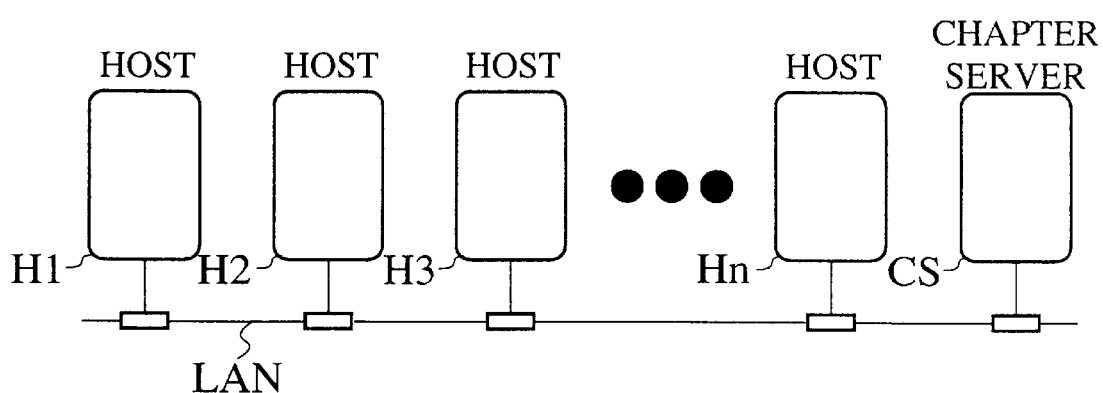
FIG. 1 is a schematic block diagram for an overall configuration of a distributed system according to the present invention.

First, the main features of the virtual space management scheme according to the present invention will be briefly summarized.

In the virtual space management scheme of the present invention, the virtual space is managed by utilizing a property of an access locality in the virtual space, that is, each computer may frequently acquire (or release) some parts of the virtual space for purpose of its own processing, but these parts of the virtual space that are utilized by a computer during processing are usually not extended over an entire virtual space and rather limited to a localized area in the virtual space. In view of this property, the virtual space is divided into relatively large units called memory chapters, and managed by allocating each divided region (memory chapter) to each computer.

According to the virtual space management scheme of the present invention, the OS of the single virtual space in which all the application programs are to be arranged is expanded to deal with the distributed processing environment by using a distributed single virtual space scheme for sharing an identical single virtual space by all the computers constituting the distributed processing environment, and in addition, the management of this distributed single virtual space is simplified by means of the allocation of the divided regions (memory chapters) as described above, so that the application programs operable in the stand alone system can be operated under the distributed processing environment without any change in the application programs themselves, and consequently a programmer can produce the application programs without being conscious of a complicated virtual space management under the distributed processing environment.

Also, a virtual space management apparatus (chapter server) for realizing a centralized management of the allocation of the divided regions (memory chapters) to the computers is provided in a distributed system, such that the management of the allocation is separated from the management of the computer resources which is realized in each computer independently, so as to make the overall operation more efficient. In this case, when there arises a need for a new region in the virtual space at each computer, each computer will request this new region to the virtual space management apparatus (chapter server), secure allocated region, and execute its processing by arranging programs and data in the secured region.

Here, the overall virtual space management operation can be made more efficient by separately defining regions (memory chapters) which serve as units for allocating parts of the virtual space shared by a plurality of computers to each computer and sub-regions (memory sections) which serve as units for realizing access protection within each allocated region.

Moreover, in order to realize the management of the distributed single virtual space efficiently, each region (memory chapter) of the virtual space is managed exclusively by a computer to which each region is allocated, such that the management becomes easier even when many computers execute one program on the virtual spaces, and the lowering of the virtual space management operation can be prevented.

Furthermore, by making a backing storage of programs and data arranged in each region of the virtual space at a disk device of a computer to which each region is allocated, it becomes possible to realize the management of the data content in each region which is closed within a computer to which each region is allocated, so that the virtual space management operation can be made even more efficient.

Referring now to FIG. 1 to FIG. 9, the first embodiment of a virtual space management scheme according to the present invention will be described in detail.

In this first embodiment, the distributed system has an overall configuration as shown in FIG. 1, which comprises a plurality of hosts H1 to Hn and a chapter server CS which are inter-connected through a high speed LAN (Local Area Network). Here, each host is a computer having at least one CPU and memory, and defining a unit to which an identifier such as an address for identifying it on the LAN (at the network layer of the OSI) is given. In many cases, each host has a disk device for storing programs, data, files, etc. At a time of execution at the host, the disk content is loaded into a physical memory supported by NSVS (Network Single Virtual Space) to be described below, and executed therein.

On each host, an OS is mounted to construct the distributed system. This OS adopts a single virtual space management scheme as a scheme for managing a virtual space in which programs and data are to be arranged. In other words, by the functions of this OS, it appears as if there exists only one virtual space, from a program operating on the host, or a user utilizing a operated program or developing a new program. This single virtual space is shared over the entire distributed system.

Figure 2:
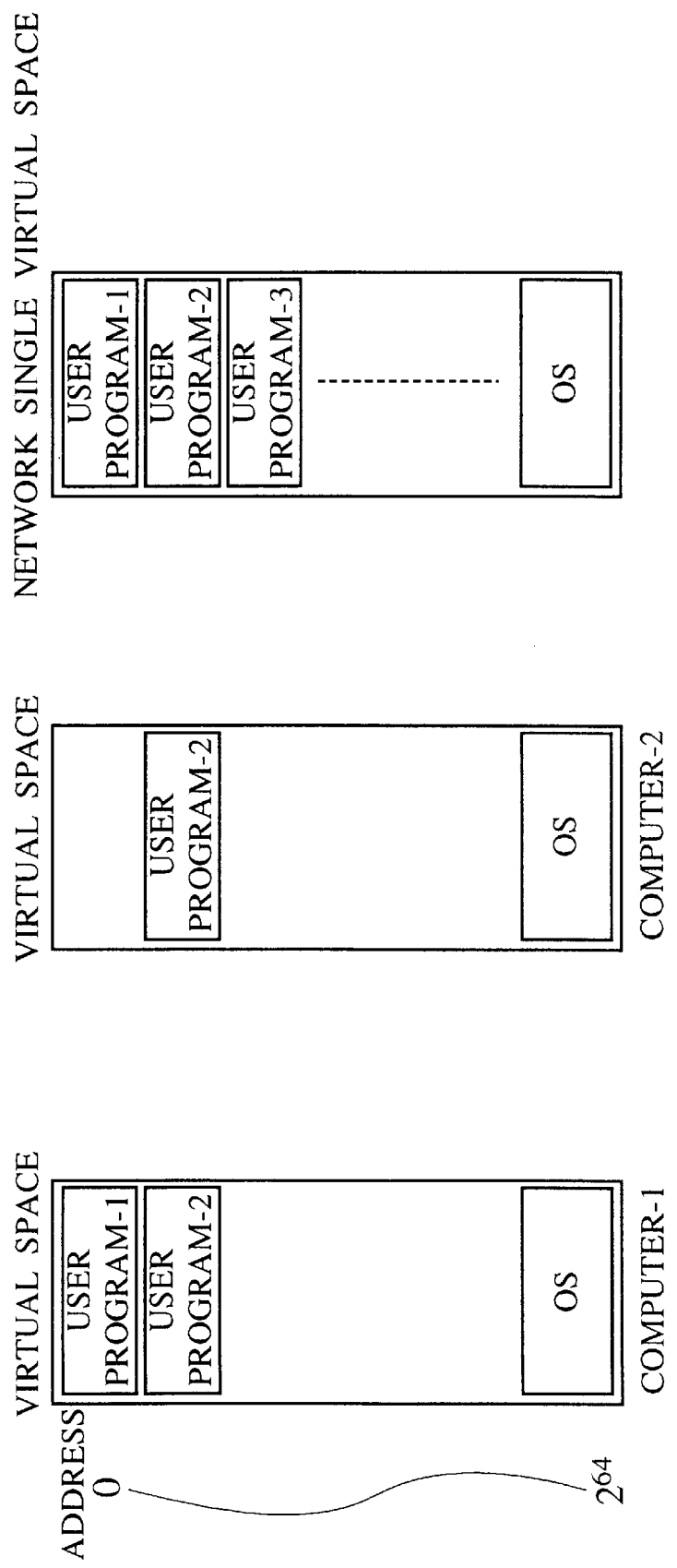
FIG. 2 is a diagram of one possible structure of a virtual space managed in the distributed system of FIG. 1.

Now, the virtual space managed in this distributed system has a structure as shown in FIG. 2. Here, a single large virtual space is managed by the entire distributed system, and all the programs, data, files, etc. handled in this system are arranged therein. This single virtual space which is shared over the entire distributed system will be referred as a network single virtual space (NSVS). In this embodiment, an address in this space is expressed in 64 bits, so that this space has a size of $2^{64}$ bytes.

This space is a virtual one created and managed by the OS, so that in reality, it is realized by a virtual space mechanism on each host. In other words, each host has its own virtual space separately, and the program arrangement in each virtual space is common to all the hosts. Here, however, not necessarily every host has all the programs, and each host has only those programs which are necessary for its processing arranged in its own virtual space. For example, in FIG. 2, a computer-1 has a program-1 and a program-2, while a computer-2 has a program-2 alone. Here, when two hosts (computer-1 and computer-2) have the same program (program-2), the OSs on these two hosts (computer-1 and computer-2) manage the respective virtual spaces such that this program is located at the same position (address) in the respective virtual spaces.

Figure 3:
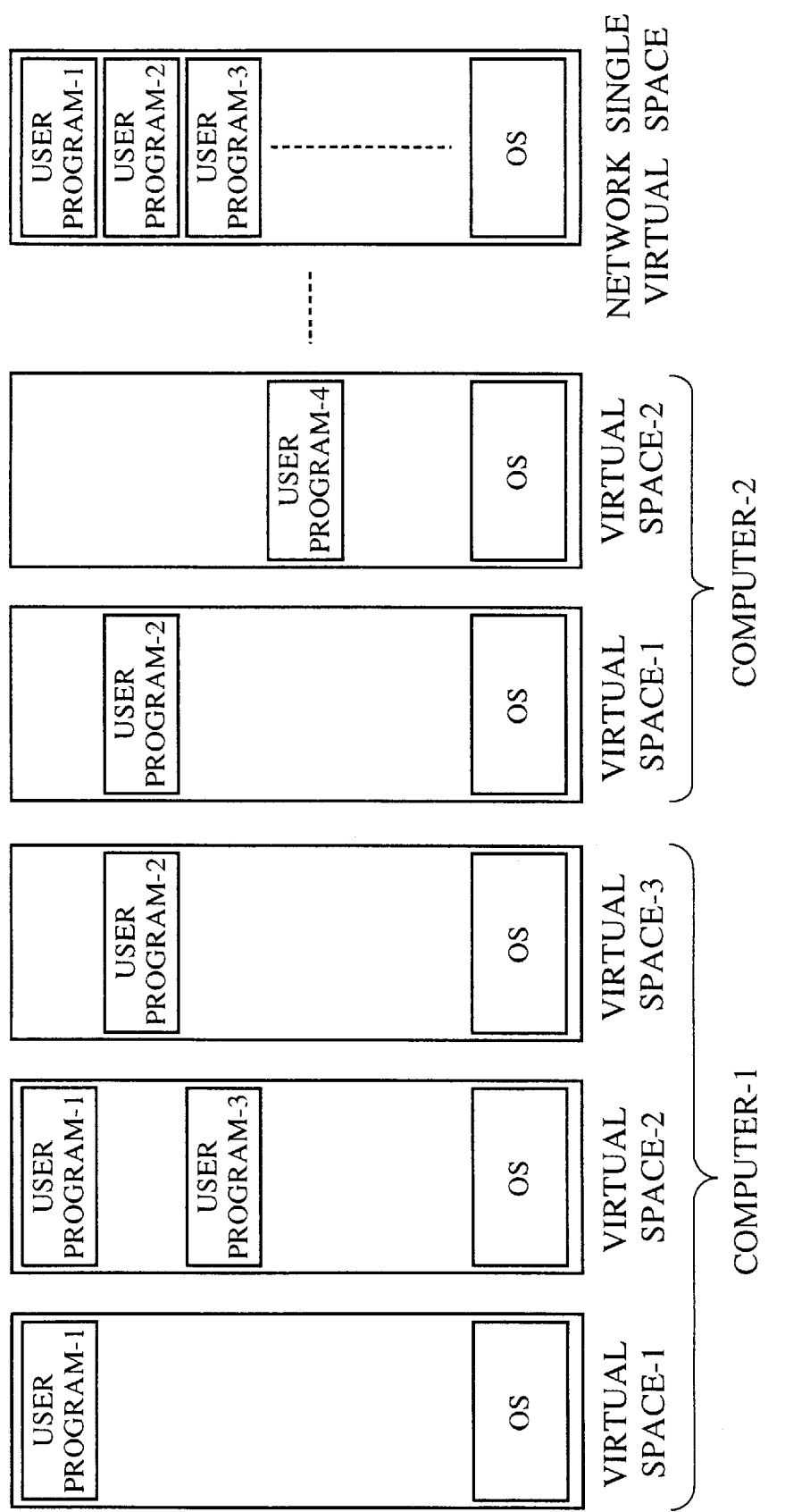
FIG. 3 is a diagram of another possible structure of a virtual space managed in the distributed system of FIG. 1.

It is to be noted that, the OS only provides the same virtual space to any user, but in practice, it is common for each host to be capable of managing a plurality of virtual spaces by means of its hardware function. Consequently, as shown in FIG. 3, it is also possible for each host to utilize a plurality of virtual spaces, while the OSs manage the respective virtual spaces such that the same program is located at the same position (address) in the respective virtual spaces.

In a case of constructing a single virtual space by the cooperation of the hosts in the distributed system, when each host secures a memory region (a part of the virtual space) independently, there is a possibility for the independently secured regions to overlap with each other, and this makes the management of the single virtual space difficult as it becomes impossible to maintain the consistency at the overlapped portion. For this reason, there is a need to provide a mechanism (overlap prevention mechanism) such that, when a certain host secures a memory region, it is possible to guarantee that the secured region is not overlapping with the regions secured by the other hosts.

To this end, in this first embodiment, the distributed system is provided with a host called chapter server which is responsible for managing the distributed state of the memory regions in order to prevent an overlap of the memory regions allocated to the hosts.

On the other hand, if each host is allowed to secure the memory region as much as necessary whenever the need arises, an overhead in the memory region overlap prevention mechanism would increase and this can significantly affect the system performance.

Also, if a scheme for distributing the memory regions to the hosts in advance is adopted, it would become impossible to flexibly deal with situations of addition or deletion of the hosts which are frequently encountered in practically running the distributed system.

For these reasons, in this first embodiment, at a time of securing a memory region through the memory region overlap prevention mechanism provided by the chapter server, each host secures a larger than necessary memory region called memory chapter at once, and extracts only a necessary memory region from the secured memory chapter for use. When the already secured memory region is used up, the securing of another memory chapter through the memory region overlap prevention mechanism is carried out. In this manner, an influence of the overhead in the memory region overlap prevention mechanism on the system performance can be reduced.

Now, the internal configurations and the operations of the chapter server and the host in the distributed system of FIG. 1 will be described in detail. In this first embodiment, in order to carry out the virtual space management efficiently, a size of the memory chapter is set to a fixed value such as $2^{48}$ bytes, and upper 16 bits of the virtual space address are used to specify a memory chapter ID.

Figure 4:
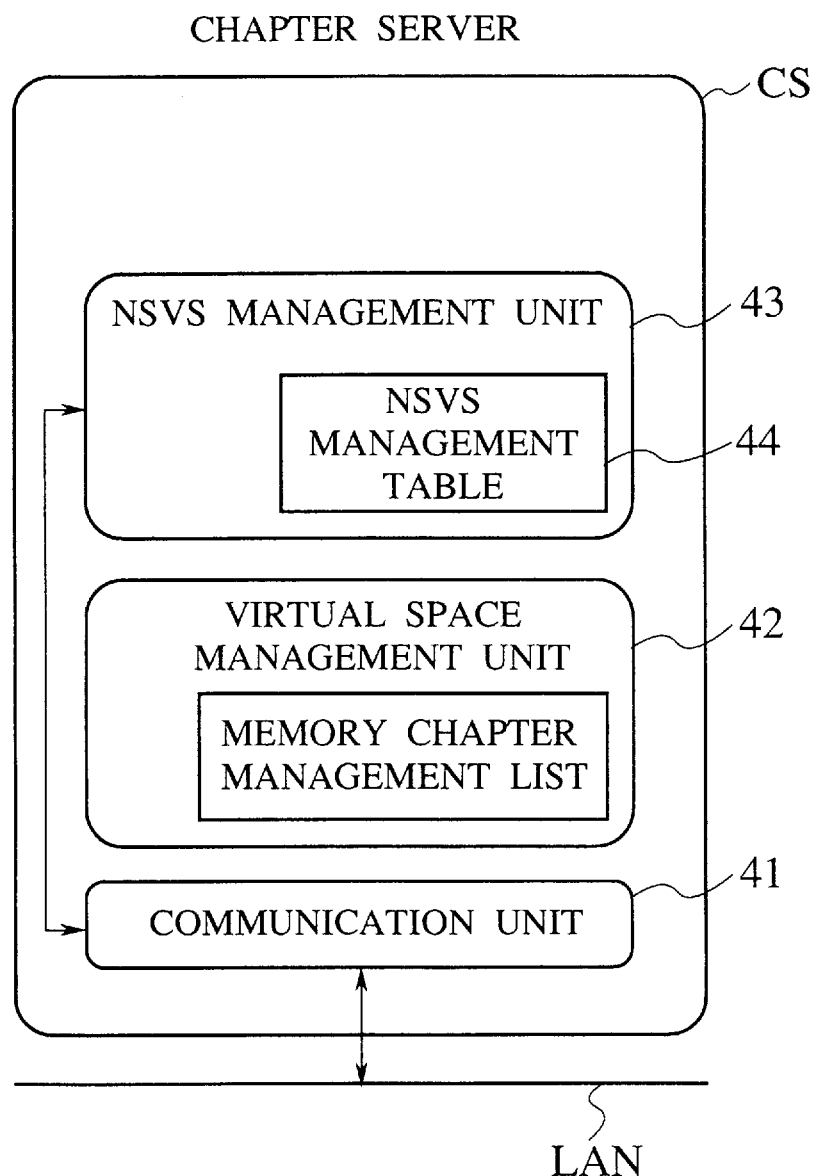
FIG. 4 is a block diagram of a chapter server in the distributed system of FIG. 1.

The chapter server in the distributed system of FIG. 1 has an internal configuration as shown in FIG. 4, which comprises a communication unit 41 for communicating with the hosts in the distributed system, and an NSVS management unit 43 for carrying out the allocation of the memory regions to the hosts in the distributed system. This NSVS management unit 43 has an NSVS management table 44 which registers a correspondence relationship between each memory chapter in use and a host (referred as a chapter owner) to which each memory chapter is allocated.

Figures 5, 6:
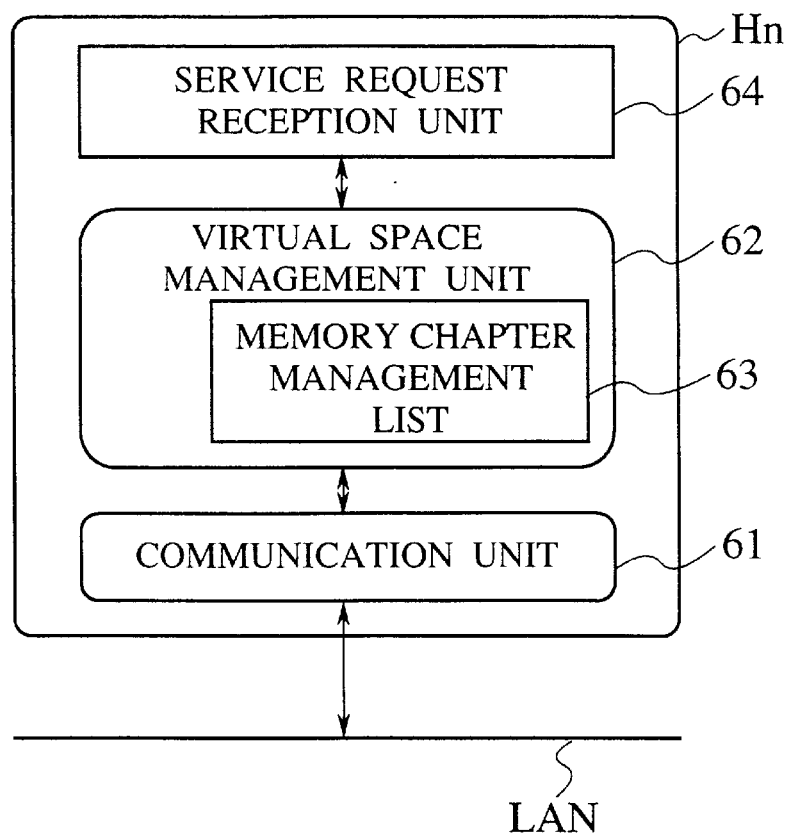
FIG. 5 is a diagrammatic illustration of an NSVS management table provided in an NSVS management unit of the chapter server of FIG. 4.
FIG. 6 is a block diagram of each host in the distributed system of FIG. 1 in a first embodiment of a virtual space management scheme according to the present invention.

In further detail, this NSVS management table 44 has a structure as shown in FIG. 5, where each entry contains fields for a memory chapter ID (chapter ID), a host ID, and a state. Here, the memory chapter ID and the host ID are expressed in hexadecimal notation. In the entries for those memory chapters which are allocated to some hosts, the state field is set to be "in use", while in the entries for those memory chapters which are not allocated to any host, the state field is set to be "unused".

It is to be noted here that this chapter server itself does not have any information concerning a utilization state of memory regions within each memory chapter, and the memory regions within each memory chapter are to be managed separately by the chapter owner who secured each memory chapter as described below.

The chapter server of FIG. 4 may optionally further include a virtual memory management unit 42 similar to that provided in each host as described below, for providing the network single virtual space with respect to the applications.

Each host in the distributed system of FIG. 1 has an internal configuration as shown in FIG. 6, which comprises a communication unit 61 for communicating with the other hosts and the chapter server in the distributed system, a service request reception unit 64 for receiving a service request (system call) from a user program (application), and a virtual memory management unit 62 (similar to the virtual memory management unit 42 mentioned above) for providing the network single virtual space with respect to the applications. This virtual space management unit 62 has a memory chapter management list 63 for managing a plurality of memory chapters secured by this host.

Figures 7, 8:
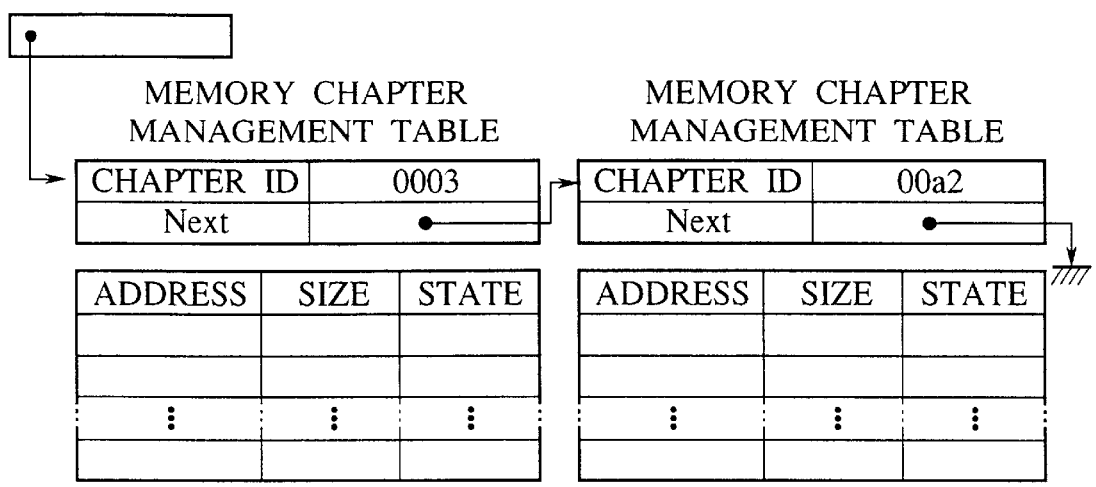
FIG. 7 is a diagrammatic illustration of a memory chapter management list provided in a virtual space management unit of each host of FIG. 6.
FIG. 8 is a diagrmmatic illustration of each memory chapter management table constituting the memory chapter management list of FIG. 7.

In further detail, this memory chapter management list 63 has a structure as shown in FIG. 7, in which a list structure is formed by tables called memory chapter management tables. Each memory chapter management table is provided in correspondence to each memory chapter secured by this host, and stores information on allocation states for memory regions in each memory chapter.

More specifically, each memory chapter management table is in a form shown in FIG. 8, which includes a memory chapter ID indicating which memory chapter this memory chapter management table is managing, and a pointer to next chapter which connects this memory chapter management table to another memory chapter management table in the memory chapter management list of FIG. 7. In addition, each memory chapter management table registers a start address, a size, and a state ("in use" or "unused") for each memory region within this memory chapter, so as to specify the utilization state of the memory regions within this memory chapter.

Figure 9:
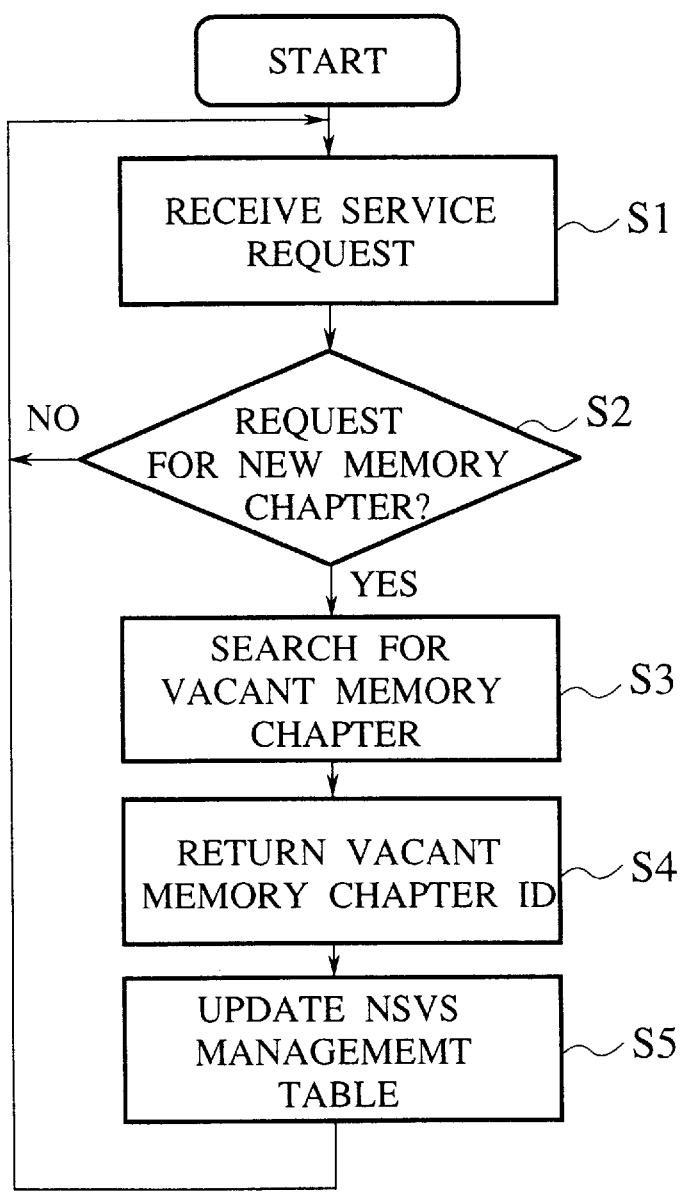
FIG. 9 is a flow chart for an operation of the chapter server of FIG. 4 in a first embodiment of a virtual space management scheme according to the present invention.

Now, in an exemplary case in which a certain host in the distributed system secures a memory region, the distributed system of FIG. 1 operates according to the flow chart of FIG. 9 as follows.

When a user program is operated on a certain host and a memory acquisition request is issued by a system call, first, at the host side, the virtual space management unit 62 of that host searches for a vacant region in the already secured memory chapters by using the memory chapter management tables. In a case there is a vacant region satisfying a size required by the memory acquisition request, a necessary memory region is secured and allocated from this vacant region and the memory chapter management table for that memory chapter is updated accordingly. On the other hand, if there is no vacant region satisfying a size required by the memory acquisition request in any of the already secured memory chapters, the host issues a new memory chapter acquisition request to the chapter server through the communication unit 61.

Then, at the chapter server side, when the service requested is received through the communication unit 41 (S1) and this received service request is a new memory chapter acquisition request (S2 YES), the NSVS management unit 43 of the chapter server searches for a vacant memory chapter by using the NSVS management table 44 (S3) by searching a memory chapter in a state of "unused" which is not yet allocated to any host in the NSVS management table 44.

Then, the found vacant memory chapter is allocated to the host which issued the new memory chapter acquisition 35 request by returning a vacant memory chapter ID of the found vacant memory chapter to the requesting source through the communication unit 41 (S4).

In addition, the NSVS management table 44 is updated by entering the host ID of the host to which the vacant memory chapter has been allocated, and changing the state field to "in use", in an entry for the found vacant memory chapter (S5).

When a new memory chapter is received from the chapter server, the virtual space management unit 62 of the host produces a new memory chapter management table in order to manage the received new memory chapter, and adds it to the memory chapter management list 63. Then, with respect to the user program which issued the memory acquisition request, a necessary memory region is secured and allocated from this new memory chapter, and the information on its allocation state is registered in the corresponding memory chapter management table. Then, the processing is returned to the user program which originally issued the service request.

Here, considering the fact that the new memory chapter requests can be issued from a plurality of hosts simultaneously, the processing of the searching and allocating at the chapter server side as described above must be carried out in an exclusive manner. For this reason, the chapter server carries out its processing sequentially, rather than processing a plurality of requests from a plurality of hosts in parallel.

Next, with references to FIG. 10 to FIG. 13, the second embodiment of a virtual space management scheme according to the present invention will be described in detail. This second embodiment concerns with a case of introducing a sub-region called memory section of the memory chapter, so as to manage the network single virtual space in terms of the memory chapters as well as the memory sections.

In this second embodiment, the distributed system has an overall configuration substantially similar to that of FIG. 1 described above.

Also, in this second embodiment, the entire virtual space is divided into regions called memory chapters, which serve as units for the management of the virtual space over a plurality of hosts, just as in the first embodiment described above. Then, each memory chapter is further divided into a plurality of sub-regions called memory sections, which serve as units for the allocation depending on memory contents, such as files, program texts, data, etc. (which will be collectively referred hereafter as programs and the like) to be arranged in the virtual space. In order words, in this case, the memory region is secured in units of memory sections, so that a user program can acquire a memory region by issuing a system call (service request with respect to the OS) for securing a new memory section.

In addition, the access protection is also carried out in units of the memory sections. Here, the access protection refers to a mechanism for limiting accesses (such as read, write, and execute) to some program and the like. In other words, it refers to an operation for permitting or rejecting an access according to information regarding which thread (or process) is trying to make this access or information regarding from which program this access is going to be made. Here, the thread refers to a subject which executes the program, which is assumed in this second embodiment to be capable of executing the program over a plurality of memory sections and reading/writing the data in a plurality of memory sections, within a range permitted by the access protection.

More specifically, a mechanism for this type of access control with respect to the program and the like can be realized by registering an information indicating permit/reject for an access from some program (or memory section) by some thread (or process) in correspondence to each memory section, and carrying out the access control according to the registered information at a time of the program execution. Further detail regarding this access control mechanism can be found in Japanese Patent Application No. 5-3937 (1993).

Also, in this second embodiment, the mapping of the virtual space to the main memory (physical memory) is assumed to be made by the paging scheme which is a general virtual space realization scheme, but the other virtual space realization scheme maybe used without loss of generality. In a case of the paging scheme, each memory section is formed by a plurality of pages. In other words, a size of each memory section is assumed to be an integer multiple of a page size.

Figure 10:
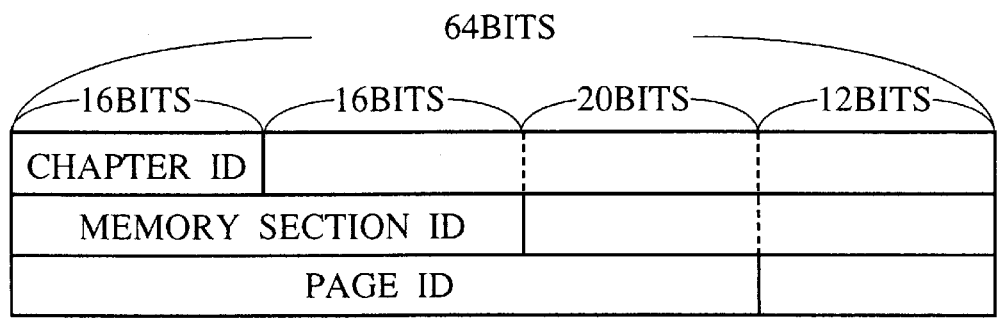
FIG. 10 is a diagrammatic illustration of an exemplary virtual space address used in a second embodiment of a virtual space management scheme according to the present invention.

Furthermore, in this second embodiment, in order to carry out the virtual space management efficiently, sizes of the memory chapter, the memory section, and the page are set to fixed values such as $2^{48}$ bytes, $2^{32}$ bytes, and $2^{12}$ bytes, respectively, and upper 16 bits of the virtual space address are used to specify a memory chapter ID, upper 32 bits of the virtual space address are used to specify a memory section ID, and upper 52 bits of the virtual space address are used to specify a page ID, as indicated in FIG. 10.

In addition, it is assumed that the thread ID managed in each host is unique (i.e., not overlapping with each other) within a range of the hosts constituting the NSVS.

Next, the data structure used in this second embodiment will be described.

In order for the NSVS to function effectively, it is important to manage how the memory chapters and memory sections are allocated. In this second embodiment, the centralized management of the information regarding which memory chapter in the NSVS is allocated to which host is carried out by a host called chapter server, just as in the first embodiment described above. More specifically, this management is carried out by using the NSVS management shown in FIG. 5, which registers a correspondence of the current chapter IDs with the host IDs of the chapter owners and the related information.

Figure 11:
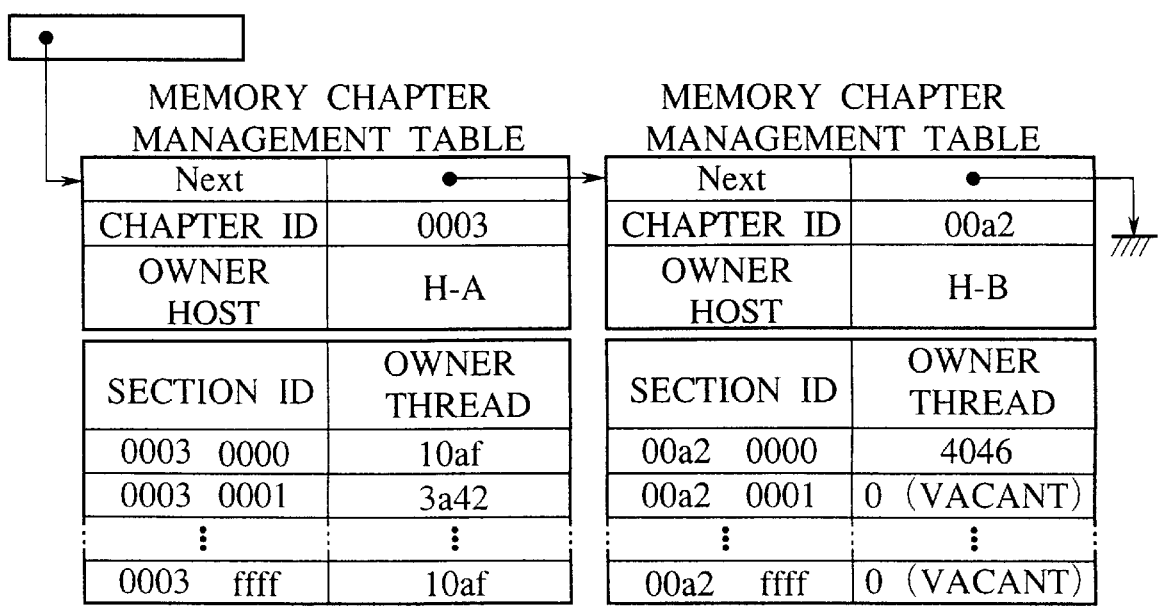
FIG. 11 is a diagrammatic illustration of a memory chapter management list used in a second embodiment of a virtual space management scheme according to the present invention.

Each host stores the information on the memory chapters currently used by this host in the memory chapter management list 63, which has a structure shown in FIG. 11 in this second embodiment. This memory chapter management list of FIG. 11 differs from that shown in FIG. 7 in that in each memory chapter management table, the memory region (start address and size) fields are replaced by a memory section ID field, and a utilization state ("in use" of "unused") field is replaced by an owner thread ID (or process ID) field for registering a thread ID of a thread which owns this memory section. When this owner thread ID field has a value "0", it indicates that it is a vacant section. In addition, an owner host field for indicating a name of an owner host who is managing this memory chapter is also added. Each host stores the management information regarding all the memory sections in each memory chapter currently used by this host in forms of the memory chapter management tables.

In addition, each host stores various information regarding the currently used memory sections in a form of a memory section management table shown in FIG. 12, which includes fields for a memory section ID, an owner thread ID, an owner host name, an access protection information, a backing storage, a distribution state, a consistency control information, and others. Here, the owner thread ID field registers a thread ID of an owner thread which manages this memory section. The backing storage field registers a correspondence relationship (such as an address within a corresponding disk) with the backing storage (such as a disk device storing the content of this memory section). The distribution state field indicates how copies of the content of this memory section are distributed in a case the memory section is shared with the other hosts. The consistency control information registers control information necessary in maintaining the consistency among the copies.

Next, the memory region management procedure in the distributed system based on the NSVS in this second embodiment will be described. Here, the management procedure is divided into two cases. One is a case of securing a new memory region, and the other is a case of utilizing the already existing memory region by sharing with the other hosts.

First, in a case of securing a new memory region at the host, the user program requests the securing of a memory section to the OS by using a system call. Then, the OS traces the memory chapter management tables to search out the memory chapter management table having its own host name in the owner host field, and search for a vacant memory section in that memory chapter management table. When a vacant memory section is found, a thread ID of a thread which requested a new memory section is registered into the owner thread field of an entry for the found vacant memory section. Then, the memory section ID of the found vacant memory section that is now secured is returned to the requesting source. In addition, a new entry is created in the memory section management table for the newly secured memory section, and relevant data are registered in this new entry. After a new memory section is created, the owner thread subsequently carries out the management of the backing storage, the management of the access protection information, and the management of the memory sharing with the other hosts.

In a case all the memory sections in the memory chapter allocated to that host are in use, this host secures a new memory chapter by the same procedure as in the first embodiment described above. Here, it is guaranteed that the memory regions of the memory chapter secured by each host are not overlapping with the memory regions secured by the other hosts, so that it is guaranteed that all the memory sections in this newly secured memory chapter are unused. Then, a new memory chapter management table is created for a newly secured memory chapter, and initialized data are registered in this new memory chapter management table. After that, the allocation of a new memory section is carried out by the same procedure as described above.

Next, a case of the data sharing in the distributed system based on the NSVS will be described. In the distributed system based on the NSVS, it is made to appear as if the same data exist at the same address from all the hosts, so that the data sharing is initiated by simply making accesses to the same address.

In this second embodiment, the access control is carried out in each memory section, so that at a time of the data sharing, it is necessary to share the memory sections first. Here, the sharing of the memory sections can be realized by making the contents of the memory sections secured by the above described procedure at one host to be readable and/or writable at the other hosts as well.

More specifically, the procedure for the sharing of the memory sections will be described for an exemplary case of sharing a memory section MS-A by hosts H-A and H-B when the host H-A originally secured this memory section MS-A and has been utilizing this memory section MS-A alone, before sharing this memory section MS-A with the host H-B. Here, it is assumed that this memory section MS-A is contained in a memory chapter MC-A, whose owner host is the host H-A.

First, a program operating on the host H-B makes an access to some address within the memory section MS-A. Here, the access can be made as a thread operating on the host H-B makes a call or a jump to that address, or reads the data at that address. At this point, however, the memory section MS-A is not yet attached to the host H-B. That is, there is no precedence for a use of this memory section MS-A at the host H-B, so that this memory section MS-A is not registered in the virtual space management unit 62 of the host H-B. Consequently, a page fault is caused at a time of the access, and a page fault handling procedure is called up.

When the page fault is caused, the OS first checks whether the page at which the fault is caused is a page that has been saved in the backing storage. Whether it is a page saved in the backing storage or not can be judged by checking the memory section management table. Namely, if this memory section MS-A is a memory section in use for which this host H-B itself is the chapter owner, there is an entry for this memory section MS-A in the memory section management table, and the backing storage storing the content of this memory section MS-A is registered in that entry. When there is a registered backing storage, the page saved in the backing storage is loaded into the main memory (physical memory) according to the usual paging scheme, and a procedure for resuming the thread (or process) which caused the fault is carried out.

Also, if this memory section MS-A is a memory section for which the other host is the chapter owner, the data are transferred from the owner host according to the registered distribution state and consistency control information and loaded into the main memory (physical memory), and a procedure for resuming the thread (or process) which caused the fault is carried out.

On the other hand, in a case this memory section MS-A is not registered in the memory section management table, it is interpreted as an access to a page possessed by the other host, so that a page ID (or memory section ID) is sent to the chapter server in order to request the search of the owner of the memory chapter MC-A which contains this page.

More specifically, the OS of the host H-B obtains the memory chapter ID from the address at which the page fault is caused. Here, the memory chapter ID can be obtained because the upper 16 bits of the address indicate the memory chapter ID. Then, the memory chapter management tables in this host H-B are searched through to check whether this memory chapter ID is registered in any of these memory chapter management tables. If this memory chapter ID is found, the owner host registered in that memory chapter management table is checked. If this memory chapter ID is not found, it is judged that this is an access to a memory section unknown to this host H-B and possessed by the other host, so that which host is the owner of the memory chapter MC-A which contains this memory section MS-A is inquired to the chapter server. Here, the chapter server has the NSVS management table as shown in FIG. 5 described above which registers a correspondence between the memory chapter ID of each memory chapter and a host ID of a host which possesses and manages each memory chapter, so that the chapter server checks the chapter owner of this memory chapter MC-A from this NSVS management table, and notifies the chapter owner ID for this memory chapter MC-A to the host H-B.

In a case the memory chapter MC-A is unused and therefore this is no chapter owner, the memory access which caused the fault is handled as an error.

When the chapter owner ID is obtained, an access request is sent to the owner host identified by the obtained chapter owner ID, along with an information necessary in receiving the access protection check such as a thread ID (or process ID) of a thread (or process) which made this request. In a case the access is permitted at the chapter owner, a copy of that page (or an entire memory section containing that page) is sent from the owner host, so that upon receiving the copy, the procedure for resuming the thread (or process) which caused the fault is carried out. In addition, if necessary, the memory chapter management table for managing that memory chapter MC-A and that memory section MS-A is requested to the owner host, and the obtained memory chapter management table is added to the memory chapter management list, or the same memory chapter management table which already exists in the memory chapter management list is updated. Also, the information regarding that memory section MS-A is added to the memory section management table.

More specifically, the host H-B sends a sharing request for the memory section MS-A along with the thread ID (or process ID) of the thread (or process) which made this access, to the chapter owner (the host H-A in this example), and receives the copy of that memory section MS-A and the corresponding memory chapter management table if necessary from the chapter owner H-A. On the other hand, the chapter owner H-A which received this sharing request makes the access permission judgement according to the thread ID of the requesting source and the access protection information in the memory section management table. When the access is permitted, the copy of that memory section MS-A is sent to the host H-B, and registers a presence of a copy for the memory section MS-A possessed by this chapter owner H-A in the host H-B into the distribution state field in the memory section management table in this chapter host H-A, while registering the consistency control information for maintaining the consistency among the copies, and provides services such as the management of lock, the delivery of updated data, and the back-up storage of the memory section MS-A with respect to the host H-B, etc. Then, at a time of an updating of data or at a time of event such as the locking/unlocking, the updated data or the locking/unlocking is notified to the host H-B which has a copy. Also, according to the request, the content of the memory chapter management table is sent to the host H-B.

When the memory section in use becomes unnecessary at the owner host and the memory section release request is issued, the OS searches through the memory chapter management list to change the state field in the entry for the released memory section to "unused", and delete all the pages belonging to that memory section from the page table storing a correspondence between the virtual space and the physical memory. In addition, the entry release operation for that memory section is also carried out in the memory section management table.

Here, in a case there is a sharing relationship with the other hosts, this sharing relationship is appropriately accounted in the release operation. For instance, the correspondence in the virtual memory is released but the physical memory is left while the other host is using this memory section.

Next, the operation of the chapter server in this second embodiment will be described.

As described above, the chapter server provides two types of service, including a processing for allocating a new memory chapter, and a processing for searching the chapter owner corresponding to a specified address or memory section ID or memory chapter ID in response to an inquiry.

In order to provide these services, the chapter server has the NSVS management table as shown in FIG. 5 described above. This NSVS management table uses the memory chapter ID as a key, such that the searching of the chapter owner can be carried out at high speed. In addition, the searching of the unused memory chapter can be carried out at high speed when this NSVS management table is formed in a list structure.

Figure 13:
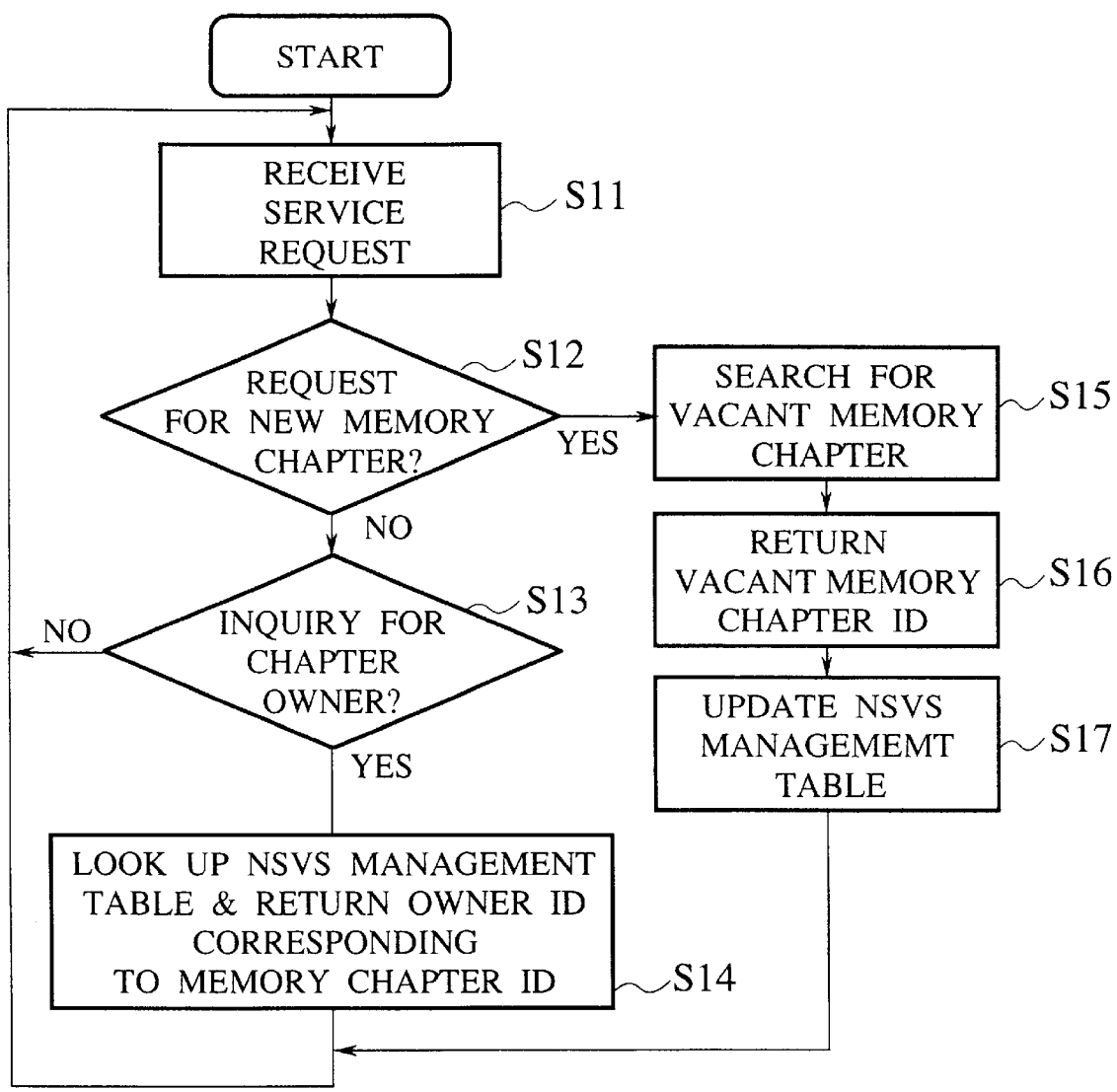
FIG. 13 is a flow chart for an operation of a chapter server of FIG. 4 in a second embodiment of a virtual space management scheme according to the present invention.

In this second embodiment, the chapter server operates according to the flow chart of FIG. 13 as follows.

Namely, the chapter server receives the service request issued by the host in the distributed system (S11), and when the received service request is a request for a new memory chapter (S12 YES), a vacant memory chapter which is in the unused state in the NSVS management table 44 is searched (S15). and the found vacant memory chapter ID is returned to the host which issued this request (S16). Here, in a case there is no vacant memory chapter, this fact is notified to the requesting source host. At this point, the search of the vacant memory chapter can be carried out at high speed if the vacant memory chapters are set in a form of a list in the NSVS management table 44.

On the other hand, when the received service request is an inquiry for the chapter owner (S13 YES), the NSVS management table 44 is looked up by using the memory chapter ID sent along the request as a key, so as to obtain the chapter owner ID at high speed. Then, the obtained chapter owner ID is returned to the host which issued this request (S14).

By repeating the above operation, the above described functions of the chapter server in this second embodiment can be realized.

While there is no service request, this chapter server may be operated to provide functions of a host in the distributed system, just like the other hosts in the distributed system.

Next, with references to FIG. 14 to FIG. 18, the third embodiment of a virtual space management scheme according to the present invention will be described in detail.

In this third embodiment, the distributed system has an overall configuration substantially similar to that of FIG. 1 described above.

Figure 14:
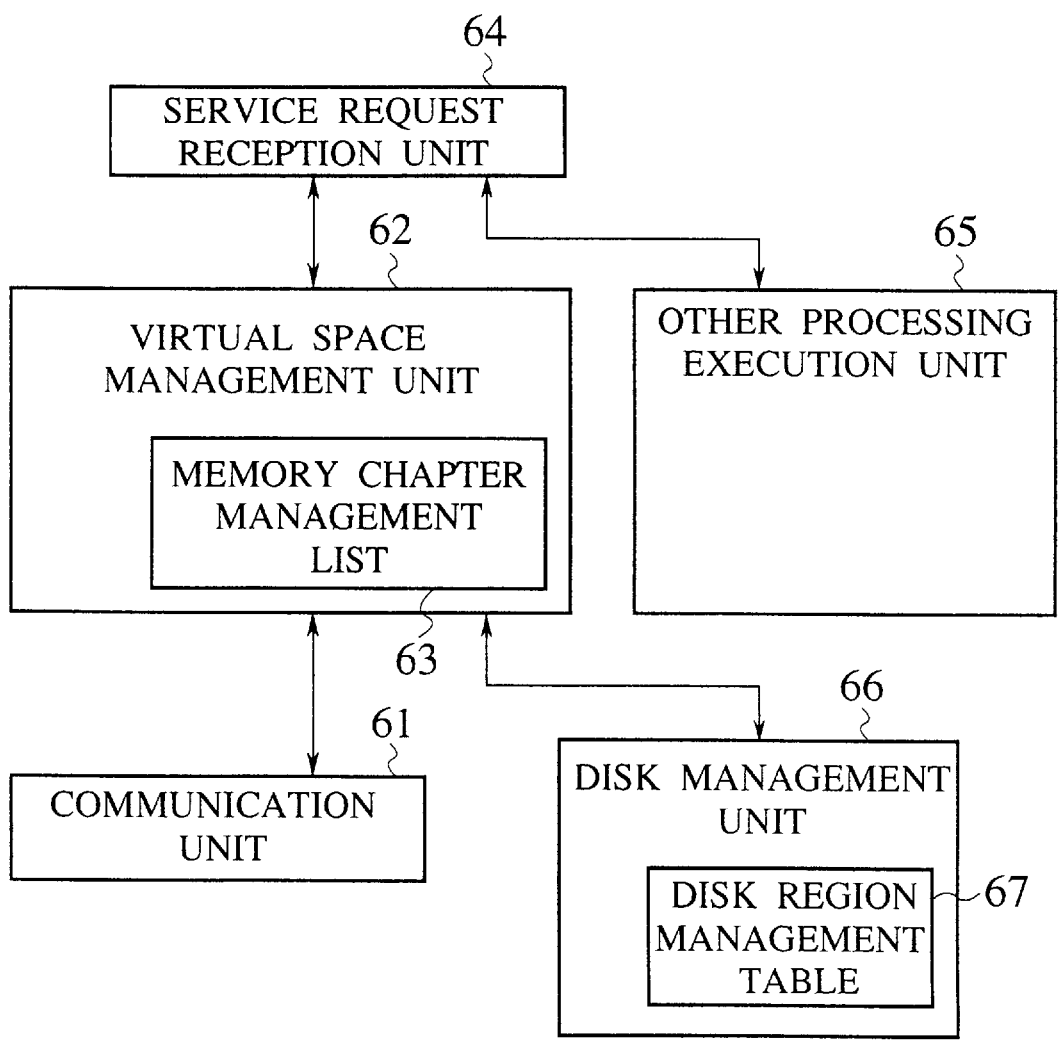
FIG. 14 is a block diagram of each host in the distributed system of FIG. 1 in a third embodiment of a virtual space management scheme according to the present invention.

On the other hand, in this third embodiment, the chapter server has an internal configuration substantially similar to that of FIG. 4 for the first embodiment described above, whereas each host in the distributed system has an internal configuration as shown in FIG. 14, which differs from that of FIG. 6 for the first embodiment described above by further comprising an other processing execution unit 65 connected with the service request reception unit 64 and a disk management unit 66 having a disk region management table 67 connected with the virtual space management unit 62.

Also, in this third embodiment, each host utilizes disk regions of a disk device connected to it as regions for actually storing data arranged in the memory chapters allocated to and managed by each host in the NSVS.

Figure 15:
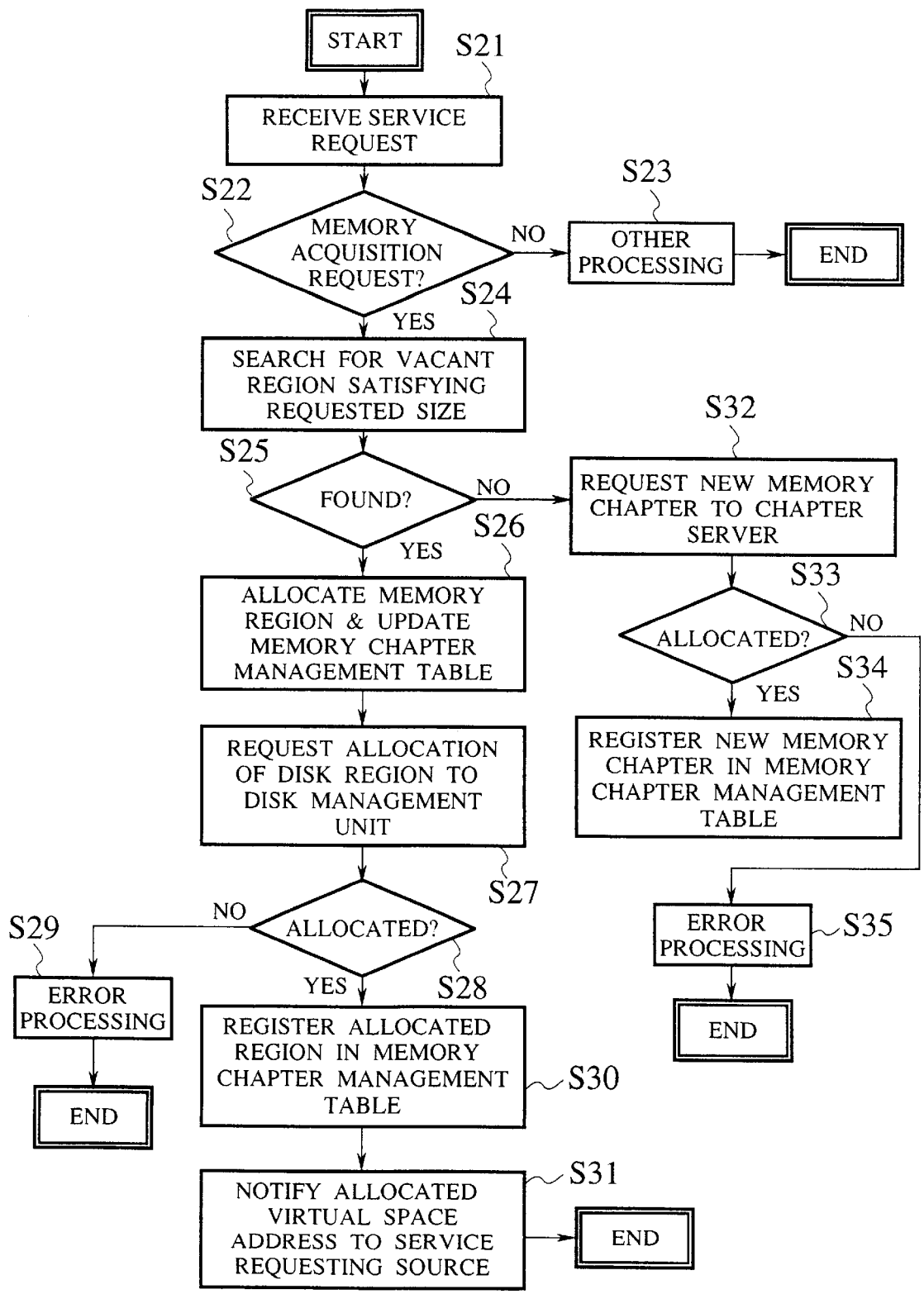
FIG. 15 is a flow chart for an operation of each host of FIG. 14.

Here, each host operates according to the flow chart of FIG. 15 as follows.

When the memory acquisition request (system call) is issued from a user program or application program operating on each host, this request is received by the service request reception unit 64 (S21). Then, whether this request is a memory acquisition request or not is judged (S22), and if not, the other processing according to the received system call is carried out by the other processing unit 65 (S23).

When the received request is the memory acquisition request, the virtual space management unit 62 searches for a vacant region satisfying a size required by the memory acquisition request from the already secured memory chapters by using the memory chapter management list 63 (S24). In a case there is a vacant region satisfying a size required by the memory acquisition request (S5 YES), a necessary memory region is secured and allocated from this vacant region and the memory chapter management table for that memory chapter is updated accordingly (S26).

Next, in order to request for an allocation of a disk region with respect to the secured memory region, the securing of a disk region is requested to the disk management unit 66 (S27). If the requested disk region cannot be secured according to a response from the disk management unit 66 (S28 NO), an error processing is carried out (S29).

Figure 16:
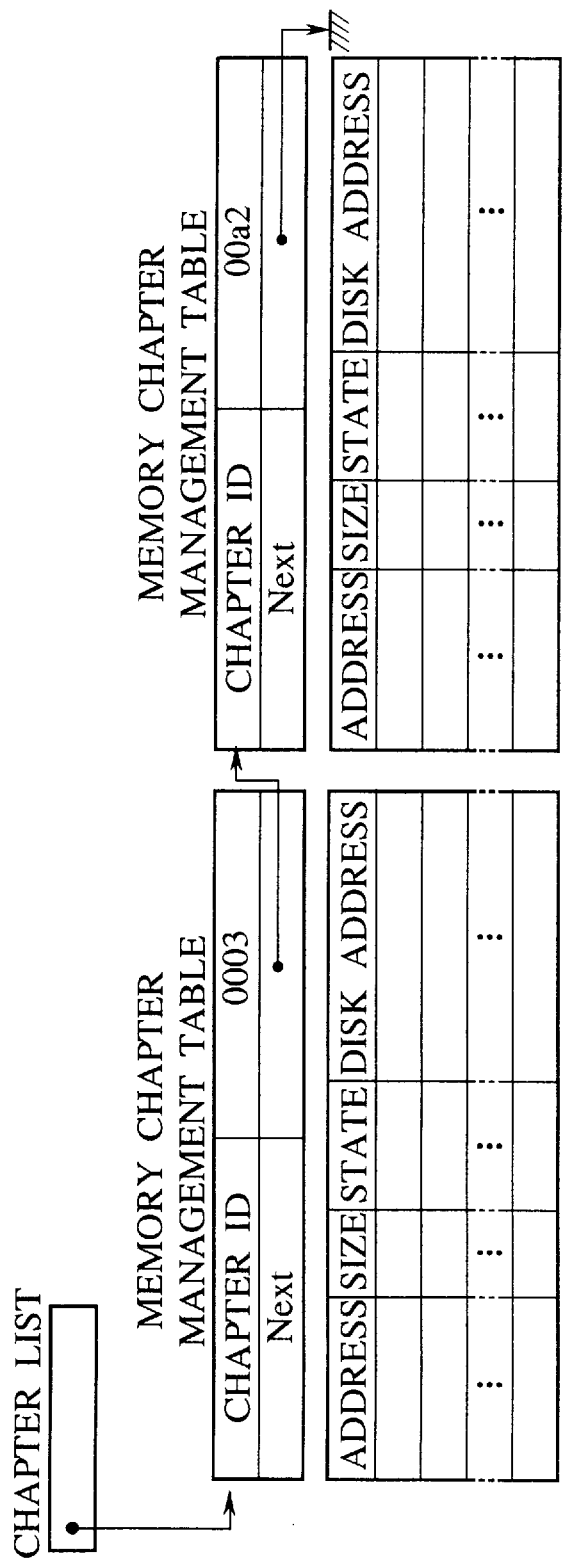
FIG. 16 is a diagrammatic illustration of a memory chapter management list provided in a virtual space management unit of each host of FIG. 14.

If the requested disk region is secured (S28 YES), the secured disk region (disk address) is registered in the memory chapter management table (S30). In this case, the memory chapter management list 63 has a structure as shown in FIG. 16, which differs from that of FIG. 7 for the first embodiment described above in that each entry also includes a disk address field for registering a necessary information such as a position (disk address) of the memory region within the disk, in correspondence to the memory regions in the virtual space. Then, the necessary information such as a start address of the acquired memory region in the virtual space is notified to the requesting source (thread or process or task) which issued the memory acquisition request, via the service request reception unit 64 (S31).

On the other hand, if there is no vacant region satisfying a size required by the memory acquisition request in any of the already secured memory chapters (S5 NO), the host issues a new memory chapter acquisition request to the chapter server through the communication unit 61 (S32).

Then, at the chapter server which received this new memory chapter acquisition request through the communication unit 41, the NSVS management unit 43 of the chapter server searches for a vacant memory chapter by using the NSVS management table 44, and the found vacant memory chapter is allocated to the host which issued the new memory chapter acquisition request. In addition, the NSVS management table 44 is updated by entering the host ID of the host to which the vacant memory chapter has been allocated, and changing the state field to "in use", in an entry for the found vacant memory chapter. This operation of the chapter server is substantially the same as in the first embodiment described above.

Then, at the requesting source host which received a response from the chapter server through the communication unit 61, whether the new memory chapter is acquired or not is judged (S33), and if not, the error processing is carried out (S35). If the new memory chapter is received from the chapter server (S33 YES), the virtual space management unit 62 of the host produces a new memory chapter management table in order to manage the received new memory chapter, and adds it to the memory chapter management list 63 (S34). Then, with respect to the thread (or process, or task) which issued the memory acquisition request, the above described steps S26 to S31 are carried out for the new memory chapter.

Figure 17:
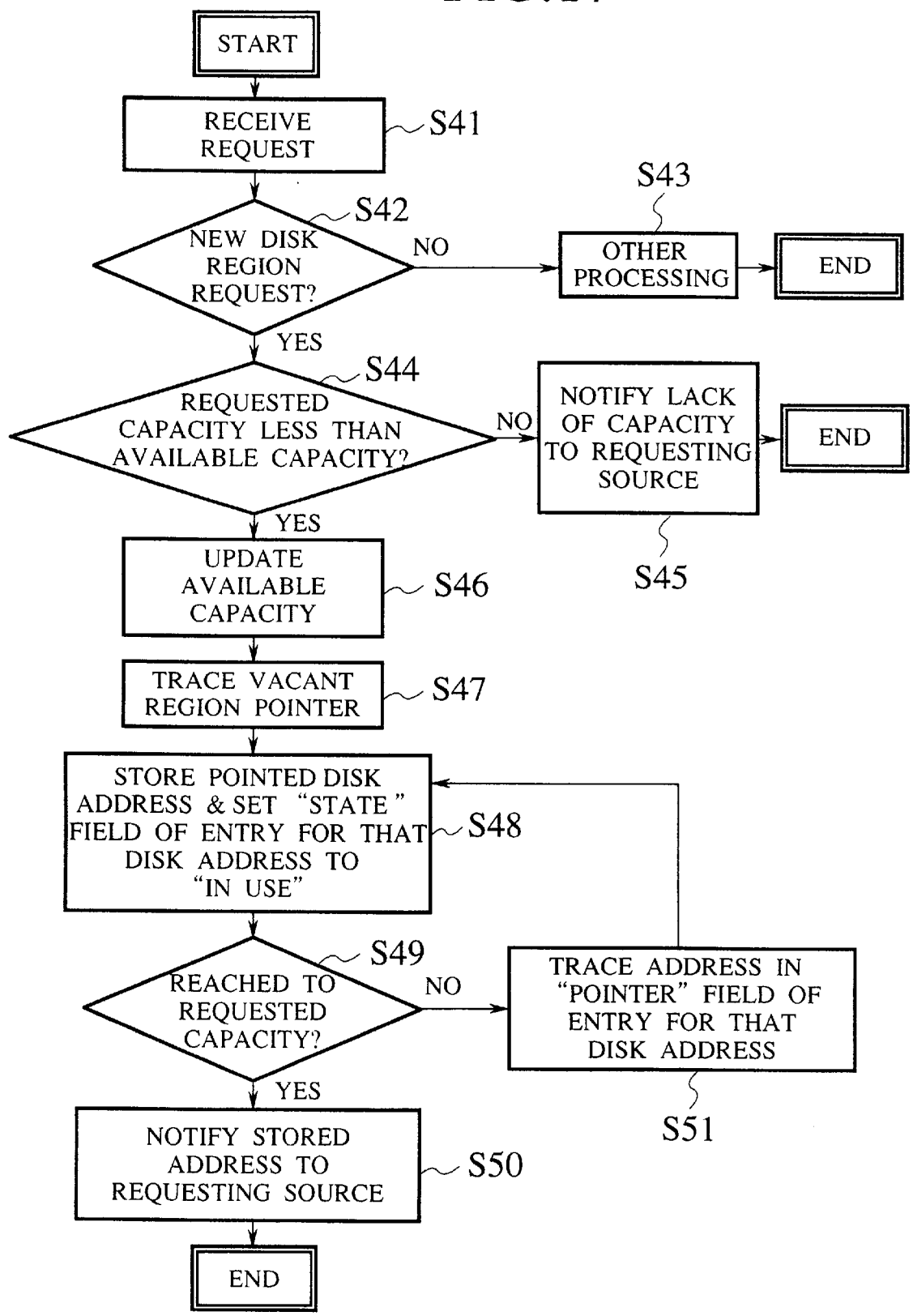
FIG. 17 is a flow chart for an operation of a disk management unit in each of FIG. 14.

On the other hand, in this third embodiment, the disk management unit 66 of each host operates according to the flow chart of FIG. 17 as follows.

Figure 18:
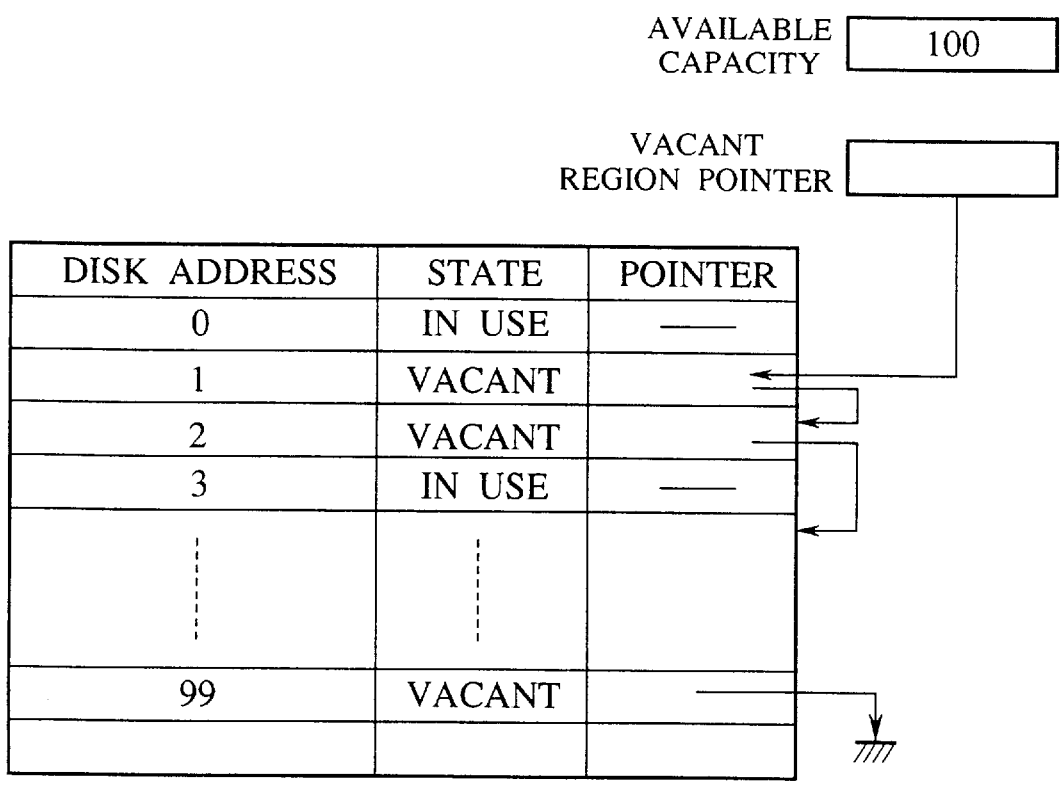
FIG. 18 is a diagrammatic illustration of a disk region management table provided in a disk management unit of each host of FIG. 14.

Here, the disk management unit 66 has the disk region management table 67 for managing the utilization state of the disk, which has a structure as shown in FIG. 18 where each entry includes a disk address field for registering a disk address managed in units of sectors of the disk, a state field for registering a utilization state of each disk region, and a pointer for sequentially pointing vacant disk regions. A size of this table is set to be sufficiently large to cover the entire physical disk capacity. This disk region management table 67 also includes an available capacity field indicating an amount of available capacity in the disk, and a vacant region pointer for pointing the first vacant disk region in the list of vacant disk regions.

First, a request reception unit (not shown) provided within the disk management unit 66 receives the request from the virtual space management unit 62 (S41), and whether the received request is a new disk region request or not is judged (S42). Here, the request can be a new disk region request for requesting a new disk region, or a request for releasing the secured disk region, etc. In a case of a new disk region request, a requested capacity is attached to the request as a parameter, whereas in a case of a request for releasing the secured disk region, a disk address of the disk region to be released is attached to the request. If the received request is not a new disk region request (S42 NO), an other processing according to the receive request is carried out (S43). In the following, a case of a new disk region request will be described in detail.

In this case, the requested capacity is compared with a value stored in an available capacity field of the disk management table 67 (S44). If there is not enough available capacity (S44 NO), a lack of capacity is notified to the requesting source, i.e., the virtual space management unit 62 (S25).

If there is a sufficient available capacity (S44 YES), the value in the available capacity field is updated by subtracting the requested capacity from the current value in the available capacity field (S46).

Then, a vacant region pointer is traced to search out and secure a vacant sector (S47). Here, the vacant sectors are sequentially connected by the list structure, so that as many sectors as necessary are extracted by tracing the vacant region pointer. In other words, the vacant region pointer is traced back as much as a necessary number of sectors, and the disk address pointed by the vacant region pointer is stored while the state field for this disk address is changed to "in use" (S48). Then, until the requested capacity is reached (S49 NO), the address in the pointer field of an entry for that disk address is traced (S51).

When the requested capacity is reached (S49 YES), i.e., when as many sectors as necessary are secured, the stored addresses of the secured sectors are returned to the requesting source (S50).

It is to be noted that the processing for releasing the disk is realized by the above described procedure in a reverse order, in which case the available capacity is increased as much as the returned sectors, and the addresses of the returned sectors are connected with the vacant region pointer, while the state of these addresses are set to be "unused".

As described in detail above, according to the present invention, in a distributed processing environment in which a plurality of computers are inter-connected through a network, management units called memory chapters which divide the virtual space into relatively large pieces are introduced, and the memory regions are allocated to the computers in the distributed system in units of these memory chapters.

Once the memory chapter is allocated to a computer, the management inside the memory chapter can be carried out independently by that computer alone, so that even under the distributed processing environment, it is possible to indepently carry out the management of the memory regions in the virtual space at which the program codes and data are to be stored at a time of program execution, without communicating with the other computers in the distributed system, and therefore it is possible to reduce an amount of communications required in the distributed system, and the virtual space management with less overhead can be realized.

Consequently, it is possible to provide an efficient single virtual space management function realized by the OSs under the distributed processing environment in which all the computers in the distributed system share the same virtual space.

Also, by using the chapter server, the centralized management of the allocation of the memory chapters in the shared virtual space to the computers can be realized, so that the virtual space management mechanism can be simplified. Here, the chapter server itself manages the allocation of the memory chapters alone and the data contents arranged in each allocated memory chapter are distributedly managed by the each computer, so that the chapter server will not be so heavily loaded.

In addition, by defining memory sections as units for access protection separately from the memory chapters which are units of allocation of memory regions, it suffices for the chapter server to carry out the management of the memory chapters alone, while it suffices for the OS of each computer to carry out the management of the memory section alone. Thus, the management functions can be separated clearly, and less mutual interactions between the OS of each computer and the chapter server are required, such that the overheads can be suppressed on both sides. In particular, even when a number of computers is increased, the overhead is not increased as much.

Moreover, in sharing the memory chapters among the computers, by exclusively managing each memory chapter at a computer which is the chapter owner of each memory chapter, it is possible for the chapter owner to manage the consistency among the memory regions in the memory chapters, without any negotiations with the other computers or the chapter server, so that the overhead can be reduced in this regard as well.

Furthermore, at a time of making an access to a memory region other than those of the owned memory chapters, a chapter owner computer of a memory chapter containing that memory region can be ascertained by inquiring the chapter server alone, without inquiring all the other computers, and thereafter it suffices to negotiate with the chapter owner computer about the use of that memory chapter, so that the sharing management can be simplified.

Moreover, by storing the back-up storage of the data in each memory chapter in a disk device of the chapter owner computer, there is no need to utilize the network at a time of saving or loading of the data, and therefore the network load due to the data communications can be eliminated.

In addition, even when the network is disconnected, no discrepancy between the data in the memory chapter and the content in the disk can be introduced, so that there is no need for a task to maintain the consistency.

Also, the memory chapter and the disk are provided in the same owner chapter computer in a closed manner, so that it is possible for a memory management unit of the OS to determine the disk for saving the data in the memory chapter without inquiring an existence of the disk to the other computers, and consequently the operation of the OS can be simplified.

It is to be noted that, in the embodiments described above, instead of obtaining the permission to use a desired region by a direct communication between the requesting host and the chapter owner, the server may also be used to send a sharing request to the chapter owner so as to obtain the permission on behalf of the requesting host, while returning the chapter owner ID as a response to the inquiry from the requesting host, and then the requesting host and the chapter owner exchange program/data by a direction communication.

It is also to be noted that the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, it is convenient to implement functions of each of the NSVS management unit 43 of the chapter server and the virtual space management unit 62 of each host as described above in a form of a separate software package.

Such a software package can be a computer program product which employs a storage medium including stored computer code which is used to program a computer to perform the disclosed function and process of the present invention. The storage medium may include, but is not limited to, any type of conventional floppy discs, hard discs, optical discs, CD-ROMs, magneto-optical discs, ROMs, RAMs, EPROMs, EEPROMs, magnetic or optical cards, magnetic tapes or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for managing a virtual space in a distributed system formed by a plurality of computers capable of communicating with each other, the method comprising the steps of:

sharing a virtual space for arranging programs and/or data among said plurality of computers;

dividing the virtual space into a plurality of regions;

requesting from each computer a part of the virtual space to be managed independently by each computer, in units of said regions;

allocating one of said regions to each computer in response to each request from each computer, while managing allocations of said regions to said plurality of computers so as not to allocate each one of said regions to more than one computer;

managing one allocated region independently at each computer; and using at one computer a part or a whole of a desired one of said regions allocated to another computer, by obtaining a permission from said another computer that independently manages said desired one region.

2. The method of claim 1, further comprising the step of:

managing each of said regions allocated to each computer independently by further dividing each of said regions into a plurality of sub-regions, and carrying out an access protection in units of said sub-regions at each computer.

3. The method of claim 1, further comprising the steps of:

inquiring from said one computer to a server which one of said plurality of computers in the distributed system manages said desired region; and responding to an inquiry from said one computer at the server by notifying which one of said plurality of computers in the distributed system manages said desired region, such that said one computer directly communicates with said another computer to access a part or a whole of said desired region.

4. The method of claim 3, wherein said one computer also directly communicates with said another computer to obtain the permission.

5. The method of claim 1, wherein at least one computer among said plurality of computers is provided with a disk device, and the method further comprising the steps of:

saving the program and/or data arranged in each of said regions allocated to said at least one computer into the disk device provided for said at least one computer; and loading the program and/or data saved in the disk device into the region allocated to said at least one computer.

6. The method of claim 1, wherein the virtual space shared at the sharing step and divided at the dividing step is a single virtual space.

7. A distributed system, comprising:

a plurality of computers capable of communicating with each other; and a server for managing a virtual space for arranging programs and/or data shared among said plurality of computers by dividing the virtual space into a plurality regions, allocating one of said regions to each computer in response to each request from each computer for securing a part of the virtual space to be managed independently by each computer, and managing allocations of said regions to said plurality of computers so as not to allocate each one of said regions to more than one computer;

wherein each computer independently manages one of said regions allocated thereto, and one computer uses a part or a whole of a desired one of said regions allocated to another computer by obtaining a permission from said another computer that independently manages said desired one region.

8. The system of claim 7, wherein each computer manages each of said regions allocated to each computer independently by further dividing each of said regions into a plurality of sub-regions, and carrying out an access protection in units of said sub-regions.

9. The system of claim 7, wherein said one computer inquires the server which one of said plurality of computers in the distributed system manages said desired region, and the server responds to an inquiry from said one computer by notifying which one of said plurality of computers in the distributed system manages said desired region, such that said one computer directly communicates with said another computer to access a part or a whole of said desired one region.

10. The system of claim 9, wherein said one computer also directly communicates with said another computer to obtain the permission.

11. The system of claim 7, wherein at least one computer among said plurality of computers is provided with a disk device, such that the program and/or data arranged in each of said regions allocated to said at least one computer are saved into the disk device provided for said at least one computer, and the program and/or data saved in the disk device are loaded into the region allocated to said at least one computer.

12. The system of claim 7, wherein the virtual space managed by the server is a single virtual space.

13. A computer apparatus for managing a virtual space for arranging programs and/or data shared among a plurality of computers capable of communicating with each other and forming a distributed system, the apparatus comprising:

management table means for registering a state of allocations of a plurality of regions dividing the virtual space to said plurality of computers;

management means for allocating one of said regions to each computer in response to each request from each computer for securing a part of the virtual space to be managed independently by each computer, according to the management table means, so as not to allocate each one of said regions to more than one computer, wherein each computer independently manages one of said regions allocated thereto such that a permission for other computers to use a part or a whole of said one of said regions can be given to the other computers by each computer.

14. The apparatus of claim 13, further comprising:

means for responding to an inquiry from one computer as to which one of said plurality of computers in the distributed system is another computer independently managing a desired one of said regions, by notifying which one of said plurality of computers in the distributed system is said another computer, such that said one computer directly communicates with said another computer according to a response to the inquiry so as to access a part or a whole of said desired one region.

15. The apparatus of claim 14, wherein said one computer also directly communicates with said another computer to obtain a permission to use a part or a whole of said desired one of said regions from said another computer according to the response to the inquiry.

16. The apparatus of claim 13, wherein the virtual space managed by the computer apparatus is a single virtual space.

17. A computer apparatus for constituting a distributed system to be formed by a plurality of computers sharing a virtual space for arranging programs and/or data managed by a server and capable of communicating with each other, the apparatus comprising:

management means for requesting an allocation of a part of the virtual space to be managed independently by the apparatus, to the server in units of a plurality of regions dividing the virtual space, and managing each of said regions allocated to the apparatus by the server so as not to allocate each one of said regions to more than one computer;

management list means for registering utilization states of sub-regions further dividing each of said regions allocated to the apparatus, such that the management means manages each of said regions by carrying out an access protection in units of said sub-regions; and communication means for communicating with another computer at a time of using a part or a whole of a desired one of said regions allocated to said another computer, so as to access a part or a whole of said desired one of said regions by obtaining a permission from said another computer that independently manages said desired one of said regions.

18. The apparatus of claim 17, further comprising:

means for inquiring the server as to which one of said plurality of computers in the distributed system manages said one desired region, and receiving a response from the server notifying which one of said plurality of computers in the distributed system manages said desired one region, such that the communication means directly communicates with said another computer to access a part or a whole of said desired one of said regions according to the response received from the server.

19. The apparatus of claim 18, wherein said communication means also directly communicates with said another computer to obtain a permission to use a part or a whole of said desired one of said regions from said another computer according to the response received from the server.

20. The apparatus of claim 17, wherein the virtual space shared by the plurality of computers is a single virtual space.

21. An article of manufacture, comprising:

a computer usable medium having computer readable program code means embodied therein for causing a server computer to manage a virtual space for arranging programs and/or data shared among a plurality of host computers capable of communicating with each other and forming a distributed system, the computer readable program code means including:

first computer readable program code means for causing the server computer to register a state of allocations of a plurality of regions dividing the virtual space to said plurality of host computers;

second computer readable program code means for causing the server computer to allocate one of said regions to each host computer in response to each request from each host computer for securing a part of the virtual space to be managed independently by each host computer, according to the registered state of allocations, so as not to allocate each one of said regions to more than one host computer, said one of said regions allocated to each computer being managed independently at each computer such that a permission for other computers to use a part or a whole of said one of said regions can be given to the other computers by each computer.

22. The article of manufacture of claim 21, wherein the computer readable program code means further includes:

third computer readable program code means for causing the server computer to respond to an inquiry from one host computer as to which one of said plurality of host computers in the distributed system is independently managing a desired one of said regions to be used by said one host computer, by notifying which one of said plurality of host computers in the distributed system manages said one desired region, such that said one host computer directly communicates with said another host computer according to a response to the inquiry so as to access a part or a whole of said desired one of said regions.

23. The article of manufacture of claim 22, wherein said one host computer also directly communicates with said another computer to obtain a permission to use a part or a whole of said desired one region according to the response to the inquiry.

24. The article of manufacture of claim 21, wherein the virtual space managed by the server computer is a single virtual space.

25. An article of manufacture, comprising:

a computer usable medium having computer readable program code means embodied therein for causing each host computer to constitute a distributed system to be formed by a plurality of host computers sharing a virtual space for arranging programs and/or data managed by a server computer and capable of communicating with each other, the computer readable program code means including:

first computer readable program code means for causing each host computer to request an allocation of a part of the virtual space to be managed independently by each host computer, to the server computer in units of a plurality of regions dividing the virtual space;

second computer readable program code means for causing each host computer to register utilization states of sub-regions further dividing each of said regions allocated to each host computer;

third computer readable program code means for causing each host computer to manage each of said regions allocated to each host computer by the server computer so as not to allocate each one of said regions to more than one host computer, by carrying out an access protection in units of said sub-regions; and fourth computer readable program code means for causing each host computer to communicate with another host computer at a time of using a part or a whole of a desired one of said regions allocated to said another host computer, so as to access a part or a whole of said desired one of said regions by obtaining a permission from said another host computer that independently manages said desired one of said regions.

26. The article of manufacture of claim 25, wherein the computer readable program code means further includes:

fifth computer readable program code means for causing each host computer to inquire the server computer as to which one of said plurality of host computers in the distributed system manages said desired one region, and receive a response from the server computer notifying which one of said plurality of host computers in the distributed system manages said one desired region, such that each host computer directly communicates with another host computer to access a part or a whole of said desired one region according to the response received from the server computer.

27. The article of manufacture of claim 26, wherein the fifth computer readable program code means also causes each host computer to directly communicate with said another computer to obtain a permission to use a part or a whole of said desired one region according to the response received from the server computer.

28. The article of manufacture of 25, claim wherein the virtual space shared by the plurality of host computers is a single virtual space.

* * * * *